United States Patent
Benevelli et al.

(10) Patent No.: US 12,214,630 B2
(45) Date of Patent: Feb. 4, 2025

(54) CONTROL DEVICE, TIRE INFLATION SYSTEM INCLUDING SAID CONTROL DEVICE, AND METHODS OF OPERATING SAID TIRE INFLATION SYSTEM

(71) Applicant: Dana Motion Systems Italia S.R.L., Reggio Emilia (IT)

(72) Inventors: Alessandro Benevelli, Reggio Emilia (IT); Biagio Borretti, Modena (IT); Luca Buscicchio, Nonantola (IT); Piergiorgio Trinchieri, Reggio Emilia (IT)

(73) Assignee: DANA MOTION SYSTEMS ITALIA S.R.L., Reggio Emilia (IT)

( * ) Notice: Subject to any disclaimer, the term of this patent is extended or adjusted under 35 U.S.C. 154(b) by 473 days.

(21) Appl. No.: 17/644,753

(22) Filed: Dec. 16, 2021

(65) Prior Publication Data
US 2022/0194147 A1 Jun. 23, 2022

(30) Foreign Application Priority Data
Dec. 17, 2020 (DE) ...................... 10 2020 216 212.3

(51) Int. Cl.
*B60C 23/00* (2006.01)

(52) U.S. Cl.
CPC .. *B60C 23/00372* (2020.05); *B60C 23/00354* (2020.05)

(58) Field of Classification Search
CPC .................. B60C 23/00354; B60C 23/00372
See application file for complete search history.

(56) References Cited

U.S. PATENT DOCUMENTS

| | | | | |
|---|---|---|---|---|
| 4,860,579 A * | 8/1989 | Beverly | ............ | B60C 23/00354 152/416 |
| 5,180,456 A * | 1/1993 | Schultz | ............. | B60C 23/00372 152/416 |
| 8,844,596 B2 | 9/2014 | Medley et al. | | |
| 2013/0282232 A1* | 10/2013 | Medley | ................. | B60C 23/002 152/427 |
| 2015/0144222 A1* | 5/2015 | Wilson | .............. | B60C 23/00354 141/66 |
| 2018/0215210 A1* | 8/2018 | Haverkamp | ...... | B60C 23/00354 |
| 2019/0308471 A1* | 10/2019 | Fiorati | ............... | B62D 49/0621 |

FOREIGN PATENT DOCUMENTS

| | | | | |
|---|---|---|---|---|
| EP | 3197691 B1 * | 8/2018 | ........... | B60C 23/003 |
| WO | WO-2017089916 A1 * | 6/2017 | ........... | B60C 23/003 |

* cited by examiner

*Primary Examiner* — Kip T Kotter
(74) *Attorney, Agent, or Firm* — McCoy Russell LLP

(57) ABSTRACT

The present document relates to a control device for a central tire inflation system, comprising: an inlet for connection with a pressure source, at least a first outlet for connection with a first pneumatic tire, a supply valve, at least a first channel valve, and at least a first pressure-limiting valve, wherein the supply valve and the first channel valve selectively fluidly connect the inlet to the first outlet and are fluidly connected in series between the inlet and the first outlet, and wherein the first pressure-limiting valve is fluidly connected to the first outlet for limiting a pressure at the first outlet. The present document further relates to methods of operating the control device for the central tire inflation system.

14 Claims, 1 Drawing Sheet

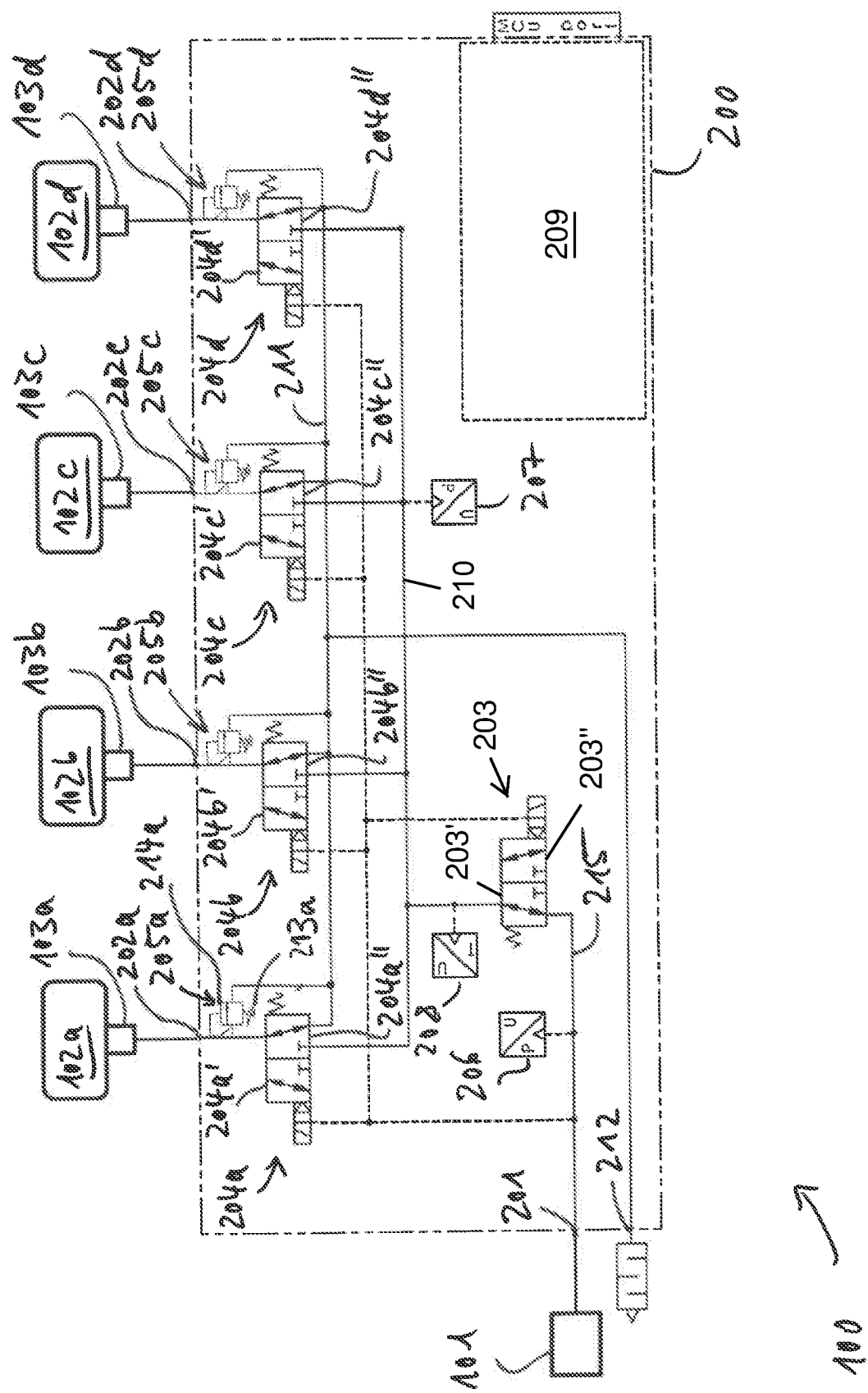

CONTROL DEVICE, TIRE INFLATION SYSTEM INCLUDING SAID CONTROL DEVICE, AND METHODS OF OPERATING SAID TIRE INFLATION SYSTEM

CROSS-REFERENCE TO RELATED APPLICATION

The present application claim priority to German Patent Application No. 10 2020 216 212.3, entitled "CONTROL DEVICE, TIRE INFLATION SYSTEM INCLUDING SAID CONTROL DEVICE, AND METHODS OF OPERATING SAID TIRE INFLATION SYSTEM", and filed on Dec. 17, 2020. The entire contents of the above-listed application is hereby incorporated by reference for all purposes.

TECHNICAL FIELD

The present disclosure relates to a control device, such as for use in a tire inflation system, to a tire inflation system including said control device, and to methods of operating said tire inflation system. Tire inflation systems of the presently proposed type may be installed on vehicles such as trucks or on working machines such as tractors, wheel loaders, dumpers, wheeled excavators, or the like.

BACKGROUND AND SUMMARY

Tire inflation systems are becoming crucial for certain vehicles such as trucks, tractors and earth-moving vehicles. Tire inflation systems are utilized to measure and adjust tire pressure to provide vehicles with the versatility to manoeuvre over different terrain types and to reduce maintenance requirements. For example, the pressure of a vehicle tire may be lowered to provide additional traction for the vehicle when the vehicle travels on soft terrain such as sand or mud, or the tire pressure may be raised to reduce the rolling resistance of the vehicle when the vehicle travels on an asphalt road. Tire inflation systems typically comprise a main fluid line for inflating and for deflating the tire, a wheel valve for controlling the processes of inflating and of deflating the vehicle tire, and a pilot fluid line for selectively opening and closing the wheel valve by applying a pilot pressure or a pilot pressure pulse to the wheel valve.

A control device for a tire inflation system is mainly based on valves flanged on a manifold which pilot wheel valves of tires in order to perform inflation, deflation, or pressure-check. Also, a control device typically includes pressure sensors, temperature sensors and an electronic control board for aggregating sensor signals and commanding the wheel valves as appropriate. Further, a control device is connected to a vehicle supply line and is responsible for actively managing tire pressure based on the running control logic.

However, a conventional control device may not sufficiently limit tire pressure. This is usually delegated to the vehicle side wherein the supply line pressure regulated.

In order to overcome this problem, presently existing solutions apply sophisticated software or complex wheel valves which automatically discharge air or rely on vehicle pressure limitation, upon exceeding a certain pressure limit.

U.S. Pat. No. 8,844,596 B2 discloses a valve for use in a central tire inflation system including a casing securable to the rim of a vehicle in communication with the tire that houses a main body connectable to a pressurized fluid supply of the central tire inflation system, and a valve member moveable within the main body to control the flow of air through the valve. The valve can be mounted flush on the exterior surface of the rim or in a recessed position within the rim, and can be connected to a manifold that is able to control the flow of pressurized fluid from the central tire inflation system to each valve and tire connected to the valve. The operation of the manifold and pressurized fluid supply can be controlled utilizing a control device operably connected to the manifold and fluid supply, and to sensing devices that supply information regarding the operational conditions of the vehicle to the controller to assist in adjusting the inflation of the tires as necessary.

Based on the prior art the objective of the present disclosure is to provide a more versatile control device.

This problem is solved by a control device including the features as described below, by a tire inflation system including said control device, and by methods of operating said tire inflation system. Special embodiments are described in detail.

Thus, a control device is presently proposed, may be for but not restricted to use in a tire inflation system. The proposed control device comprises:

an inlet for connection with a pressure source,
at least a first outlet for connection with a first pneumatic tire,
a supply valve,
at least a first channel valve, and
at least a first pressure-limiting valve,
wherein the supply valve and the first channel valve selectively fluidly connect the inlet to the first outlet and are fluidly connected in series between the inlet and the first outlet, and
wherein the first pressure-limiting valve is fluidly connected to the first outlet for limiting a pressure at the first outlet.

Advantageously, the first-pressure limiting valve being fluidly connected to the first outlet for limiting pressure at the first outlet improves the control device in that a desired function is present with respect to limiting tire pressure at the first outlet. In this manner, the first pressure-limiting valve may prevent that a pressure in a first tire fluidly connected to the first outlet exceeds a threshold pressure, for example when pressurizing or inflating the first tire via the first outlet.

The control device may comprise a second outlet for connection with a second pneumatic tire, a second channel valve, and a second pressure-limiting valve. For instance, the supply valve and the second channel valve may selectively fluidly connect the inlet to the second outlet and may be fluidly connected in series between the inlet and the second outlet, and the second pressure limiting valve may be fluidly connected to the second outlet for limiting a pressure at the second outlet.

Similar to the case of the first-pressure limiting valve, the second-pressure limiting valve being fluidly connected to the second outlet for limiting pressure at the second outlet improves the control device in that a desired function is present with respect to limiting tire pressure.

The supply valve may selectively fluidly connect the inlet to the first channel valve, or may connect the inlet in parallel to the first channel valve and to the second channel valve.

The control device may comprise a vent for venting fluid from the first outlet and/or from the second outlet.

The first pressure-limiting valve may include a biasing member biasing the first pressure-limiting valve towards a closed position in which the first pressure-limiting valve blocks the venting of fluid from the first outlet through the first pressure-limiting valve. For instance, the first pressure-limiting valve may include a pressure-actuatable actuator fluidly connected to the first outlet and biasing the first pressure-limiting valve towards an open position in which the first pressure-limiting valve fluidly connects the first outlet to the vent via the first pressure-limiting valve.

The second pressure-limiting valve may include a biasing member biasing the second pressure-limiting valve towards a closed position in which the second pressure-limiting valve blocks the venting of fluid from the second outlet through the second pressure-limiting valve. For instance, the second pressure-limiting valve may include a pressure-actuatable actuator fluidly connected to the second outlet and biasing the second pressure-limiting valve towards an open position in which the second pressure-limiting valve fluidly connects the first outlet to the vent via the second pressure-limiting valve.

The first channel valve may be configured to be selectively placed in either one of a first control position and a second control position, the first channel valve in the first control position fluidly connecting the supply valve to the first outlet, and the first channel valve in the second control position fluidly isolating the supply valve from the first outlet and fluidly connecting the first outlet to the vent.

The second channel valve may be configured to be selectively placed in either one of a first control position and a second control position, the second channel valve in the first control position fluidly connecting the supply valve to the first outlet, and the first channel valve in the second control position fluidly isolating the supply valve from the first out-let and fluidly connecting the first outlet to the vent.

One or more of the supply valve, the first channel valve and the second channel valve may be configured to be actuated via electromagnetic signals.

The control device may comprise an electronic control unit, and at least one pressure sensor in communication with the electronic control unit. For instance, the electronic control unit may be configured to control one or more of the supply valve, the first channel valve and the second channel valve based on at least one signal received from the at least one pressure sensor.

The at least one pressure sensor may comprise one or both of a first pressure sensor configured to measure a pneumatic pressure at the inlet, and a second pressure sensor configured to measure a pneumatic pressure in a fluid conduit fluidly connecting the supply valve to the first channel valve, or fluidly connecting the supply valve to the first channel valve and to the second channel valve.

The control device may comprise a manifold block, wherein the inlet, the outlet, the supply valve, the first channel valve and the first pressure-limiting valve, and for instance the second channel valve and the second pressure-limiting valve, are disposed in or mounted on the manifold block.

Further, a tire inflation system is proposed, which may be a central tire inflation system. The proposed tire inflation system comprises:
the above-mentioned control device,
a pressure source such as a compressor or a pump fluidly connected or selectively fluidly connected to the inlet of the control device, and
at least a first tire fluidly connected or selectively fluidly connected to the first outlet of the control device.

A presently proposed method of operating the above-described control device comprises the steps:
fluidly connecting the inlet to the first outlet via the supply valve and the first channel valve,
pressurizing the first outlet, and for instance a first tire fluidly connected to the first outlet, via the inlet, the supply valve and the first channel valve, for example using a pressure source fluidly connected to the inlet, and
if or when a pressure at the first outlet exceeds a threshold pressure, venting the first outlet via the first pressure-limiting valve.

Another presently proposed method of operating the above-described control device comprises the steps:
venting the first outlet, and for instance a first tire fluidly connected to the first outlet, by placing the first outlet in fluid communication with a vent via the first channel valve.

Another presently proposed method of operating the above-described control device comprises the steps:
closing the supply valve to fluidly isolate the first outlet from the inlet;
placing the first outlet, and for instance a first tire fluidly connected to the first outlet, in fluid communication with a pressure sensor via the first channel valve, and
measuring a pressure at the first outlet, and for instance a pressure in a first tire fluidly connected to the first outlet, using the pressure sensor.

BRIEF DESCRIPTION OF THE FIGURE

An embodiment of the presently proposed control device and an embodiment of the presently proposed tire inflation system are described in the following detailed description and are depicted in the accompanying drawing in which:
FIG. 1 schematically shows an embodiment of a tire inflation system including a control device.

DETAILED DESCRIPTION

A schematic illustration of an embodiment of a tire inflation system 100 for a vehicle is provided in FIG. 1. The tire inflation system 100 comprises a pressure source 101, tires 102*a-d*, wheel valves 103*a-d* mounted on each tire, respectively, and a control device 200. The wheel valves 103*a-d* may be affixed to the tires 102*a-d*, respectively. Among other things, the control device 200 comprises an inlet 201 fluidly connected to the pressure source 101, outlets 202*a-d* selectively fluidly connected to the tires 102*a-d* via the wheel valves 103*a-d*, respectively, and a vent 212. The control device 200 is configured to selectively fluidly connect the pressure source 101 to one or more of the tires 102*a-d*, for example for inflating one or more of the tires 102*a-d*. The control device 200 is further configured to selectively place one or more of the tires 102*a-d* in fluid communication with the atmosphere or with a low pressure tank via the vent 212, for example for deflating one or more of the tires 102*a-d*.

The pressure source 101 may include an air compressor which may be attached to the vehicle, for example. The pressure source 101 may also comprise an air tank. The pressure source 101 is configured to supply pressurized air to the air tank for storage therein. Pressurized air from the pressure source 101 may be provided to the inlet 201 of the control device 200, for example via the air tank. A drier may be provided for removing water from the pressure source 101. A filter may also be interposed between the pressure source 101 and the inlet 201 of the control device 200.

The tires 102*a-d* typically contain air at a certain pressure which will hereinafter be referred to as tire pressure. For instance, the tire pressure is within a predetermined range of a target tire pressure. The target tire pressure can be selected to be a desired pressure. If it is determined that the tire pressure is above the range including the target tire pressure, the tire pressure can be decreased.

The control device further comprises a supply valve 203, channel valves 204a-d, and pressure-limiting valves 205a-d.

The supply valve 203 and the channel valves 204a-d selectively fluidly connect the inlet 201 to the outlets 202a-d, respectively. More specifically, the supply valve 203 and the channel valves 204a-d are fluidly connected in series between the inlet 201 and the outlets 202a-d, respectively. That is, the supply valve 203 and the first channel valve 204a are fluidly connected in series between the inlet 201 and the first outlet 202a, the supply valve 203 and the second channel valve 204b are fluidly connected in series between the inlet 201 and the second outlet 202b, and so on. The control device 200 comprises a first conduit, also denoted as first common rail 210, and the supply valve 203 is fluidly connected to each of the channel valves 204a-d via the first common rail 210. The supply valve 203 selectively fluidly connects the inlet 201 to the first common rail 210. The supply valve 203 has an open position 203' and a closed position 203". When the supply valve 203 is switched to its open position 203', the supply valve 203 fluidly connects the inlet 201 to the first common rail 210 and to the channel valves 204a-d. And when the supply valve 203 is switched to its closed position 203", the supply valve 203 fluidly isolates the inlet 201 from the first common rail 210 and from the channel valves 204a-d.

Each of the pressure-limiting valves 205a-d is fluidly connected to one of the outlets 202a-d for limiting a pressure at the outlets 202a-d, respectively. That is, the first pressure-limiting valve 205a is fluidly connected to the first outlet 202a, the second pressure-limiting valve 205b is fluidly connected to the second outlet 202b, and so on. Each of the pressure-limiting valves 205a-d selectively fluidly connects one of the outlets 202a-d to the vent 212. More specifically, the control device 200 further comprises a second conduit, also termed second common rail 211, fluidly connected to the vent 212, and each of the pressure limiting valves 205a-d selectively fluidly connects one of the outlets 202a-d to the second common rail 211.

Each of the pressure-limiting valves 205a-d is designed or configured to selectively place one of the outlets 202a-d in fluid communication with the vent 212 when a pressure at the corresponding outlet exceeds a predetermined threshold pressure. For example, when inflating one or more of the tires 102a-d via one or more of the outlets 202a-d, the pressure-limiting valves 105a-d limit the fluid pressure at the outlets 202a-d and in the tires 102a-d connected to the outlets 202a-d, thereby preventing material fatigue or tire damage. For instance, the pressure-limiting valves 205a-d are configured or designed such that the threshold pressure determined by the design of the pressure-limiting valves 205a-d is equal to or smaller than a maximum tolerable pressure of the tires 102a-d. Clearly, depending on the design of the tires 102a-d, the different pressure-limiting valves 205a-d may be configured or designed to open at different threshold pressures. That is, if the first tire 102a is configured or designed such that it may tolerate a higher maximum pressure than the second tire 102b, a threshold pressure at which the first pressure-limiting valve 205a opens may be higher than a threshold pressure at which the second pressure-limiting valve 205b opens.

The first pressure-limiting valve 205a may include a biasing member 213a biasing the first pressure-limiting valve 205a towards a closed position in which the first pressure-limiting valve 205a blocks the venting of fluid from the first outlet 202a through the first pressure-limiting valve 205a. For example, the biasing member 213a may include a spring or another elastic member. And the first pressure-limiting valve 205a may include a pressure-actuatable actuator 214a fluidly connected to the first outlet 202a and biasing the first pressure-limiting valve 205a towards an open position in which the first pressure-limiting valve 205a fluidly connects the first outlet 202a to the vent 212 via the first pressure-limiting valve 205a.

The biasing member 213a and the pressure-actuatable actuator 214a are configured or designed such that the first pressure-limiting valve 205a is in the closed position and blocks the venting of fluid from the first outlet 202a through the first pressure-limiting valve 205a when the pressure at the first outlet 202a is below a predetermined threshold pressure, and that the first pressure-limiting valve 205a is in the open position and allows the venting of fluid from the first outlet 202a through the first pressure-limiting valve 205a when the pressure at the first outlet 202a is at or above the predetermined threshold pressure. The value of the predetermined threshold pressure depends on the design of the biasing member 213a and of the pressure-actuatable actuator 214a. For example, the biasing member 213a may be configured such that a biasing force exerted by the biasing member 213a and biasing the first pressure-limiting valve 205a toward the closed position can be tuned to vary the threshold pressure. Pressure-limiting valves such as the first pressure-limiting valve 205a described above are commonly known in the art of pneumatics or hydraulics.

In the embodiment of the control device 200 depicted here, the further pressure-limiting valves 205b-d are configured or designed in the same way as the first pressure-limiting valve 205a. However, it is understood that in alternative embodiments of the control device 200 not all pressure-limiting valves fluidly connected to the outlets have to be configured or designed in the same way.

Each of the channel valves 204a-d may be configured to be selectively placed in either one of a first control position 204a-d' and a second control position 204a-d", respectively. For example, in their first control position 204a-d' the channel valves 204a-d fluidly connect the first common rail 210 and the supply valve 203 to the outlets 202a-d, respectively, and fluidly isolate the outlets 202a-d from the second common rail 211 and from the vent 212, respectively. On the other hand, in their second control position 204a-d" the channel valves 204a-d fluidly isolate the first common rail 210 and the supply valve 203 from the outlets 202a-d, respectively, and fluidly connect the outlets 202a-d to the second common rail 211 and to the vent 212, respectively. The channel valves 204a-d may be configured as solenoid valves that are pre-biased toward the second control position 204a-d". In other words, the channel valves 204a-d may be configured such that they are normally switched to their second control position 204a-d" unless they are actively switched to their first control position 204a-d' by an electromagnetic signal such as by an activating current in their solenoid. Similarly, the supply valve 203 may be configured as a solenoid valve that is pre-biased toward its open position 203', for example by a biasing member such as a spring. In other words, the supply valve 203 may be configured such that it is normally switched to its open position 203' unless it is actively switched to its closed position 203" by an electromagnetic signal such as by an activating current in its solenoid.

The control device 200 may include one or more sensors, such as a first pressure sensor 206, a second pressure sensor 207, and a temperature sensor 208. In the embodiment of the control device 200 depicted here, the first pressure sensor 206 may be configured to measure a fluid or air pressure at the inlet 201, including when the supply valve is in its closed position 203". For example, the first pressure sensor 206 may be disposed at or along a fluid line 215 fluidly connecting the inlet 201 to the supply valve 203. The second pressure sensor 207 may be configured to measure a fluid or air pressure in a fluid conduit or fluid line fluidly connecting the supply valve 203 to the channel valves 204a-d, for example in the first common rail 210. In other words, the second pressure sensor 207 may be disposed at or along the first common rail 210. And the temperature sensor 208 may be configured to measure a fluid or air temperature in a fluid conduit or fluid line fluidly connecting the supply valve 203 to the channel valves 204a-d, for example in the first common rail 210 or in a fluid conduit or fluid line fluidly connecting the supply valve 203 to the first common rail 210.

The control device 200 may further include an electronic control unit (ECU) 209. The ECU 209 typically includes a programmable device such as an FPGA, a microprocessor, or the like. The ECU 209 may be in communication with one or more or all of the sensors 206, 207, 208, for example via wired or wireless connections. That is, the ECU 209 may be configured to receive sensor signals or sensor data from one or more or all of the sensors 206, 207, 208. And the ECU 209 may be in communication with one or more or all of the supply valve 203, the channel valves 204a-d, and possibly the wheel valves 103a-d for controlling one or more or all of the supply valve 203, the channel valves 204a-d, and possibly the wheel valves 103a-d. The ECU 209 may be in communication with one or more or all of the valves 203, 204a-d, 103a-d via wired or wireless connections. For example, the ECU 209 may be configured to control one or more or all of the valves 203, 204a-d, 103a-d based on sensor signals or sensor data received from one or more or all of the sensors 206, 207, 208.

The control device 200 includes a manifold block. All or some of the valves 203, 204a-d, 205a-d may be disposed in or mounted on the manifold block. Similarly, all or some of the sensors 206, 207, 208, and/or all or some of the fluid lines of 210, 211, 215 may be disposed in or mounted on the manifold block. In some embodiments, also the ECU 209 may be disposed in or mounted on the manifold block.

In the following, different modes of operation of the tire inflation system 100 and the control device 200 are described.

In one mode of operation, the tire pressure in one or more of the tires 102a-d may be checked. For example, the tire pressure in a single tire may be checked, or the tire pressure in two or more tires may be checked, either one by one and consecutively, or simultaneously.

For example, in order to check the tire pressure in the first tire 102a, the ECU 209 switches the supply valve 203 to the closed position 203" to fluidly isolate the first common rail 210 from the inlet 201. Additionally, the ECU 209 closes the wheel valves 103b-d of the second, third and fourth tire 102b-d to fluidly isolate the tires 102b-d from the first common rail 210 and from the vent 212. The ECU 209 then switches the first channel valve 204a to the first control position 204a' to fluidly connect the first outlet 202a to the first common rail 210 and to the second pressure sensor 207, and to fluidly isolate the first outlet 202a from the vent 212. Subsequently, the first wheel valve 103a is opened to place the first tire 102a in fluid communication with the first common rail 210 and with the second pressure sensor 207.

In this situation, the second pressure sensor 207 measures the tire pressure in the first tire 102a. The second pressure sensor 207 may then communicate a pressure sensor signal or pressure sensor data indicative of the tire pressure in the first tire 102a to the ECU 209. After the pressure check, the wheel valve 103a may be closed. Additionally, the ECU 209 may switch the first channel valve 204a to the second control position 204a".

Based on the above description of the individual check or measurement of the tire pressure in the first tire 102a, a person of ordinary skill readily understands how an individual check or measurement of the tire pressure in one of the other tires 102b-d may be performed in an analogous manner. In this manner, the tire pressure in an arbitrary number of tires may be checked or measured by consecutively carrying out individual tire pressure checks. Importantly, only a single pressure sensor 207 is required to check or measure the pressure in the different tires 102a-d.

Similarly, the tire pressure in two or more of the tires 102a-d may be checked or measured simultaneously. This may significantly reduce the time necessary to perform a pressure check on two or more tires. For example, in order to check the tire pressure in the first tire 102a and in the second tire 102b simultaneously, the ECU 209 switches the supply valve 203 to the closed position 203" to fluidly isolate the first common rail 210 from the inlet 201. Additionally, the ECU 209 closes the wheel valves 103c-d of the third and fourth tire 102c-d to fluidly isolate the tires 102c-d from the first common rail 210 and from the vent 212. The ECU 209 then switches the first channel valve 204a and the second channel valve 204b to their first control position 204a', 204b', respectively, to fluidly connect the first outlet 202a and the second outlet 202b to the first common rail 210 and to the second pressure sensor 207, and to fluidly isolate the first outlet 202a and the second outlet 202b from the vent 212. Subsequently, the first wheel valve 103a and the second wheel valve 103b are opened to simultaneously place the first tire 102a and the second tire 102b in fluid communication with the first common rail 210 and with the second pressure sensor 207. In this situation, the pressure in the first tire 102a and in the second tire 102b equalizes via the first common rail 210, and the second pressure sensor 207 measures the tire pressure in the first tire 102a and in the second tire 102b. The second pressure sensor 207 may then communicate a pressure sensor signal or pressure sensor data indicative of the tire pressure in the first tire 102a and in the second tire 102b to the ECU 209. After the pressure check, the wheel valves 103a, 103b may be closed. Again, the layout of the control device 200 allows simultaneously checking or measuring the tire pressure of different tires using only a single pressure sensor 207.

In another mode of operation, the tire pressure in one or more of the tires 102a-d may be increased by inflating one or more of the tires 102a-d. For example, a single tire may be inflated, or two or more tires may be inflated, either one by one and consecutively, or simultaneously.

For example, when checking the tire pressure in the first tire 102a in accordance with the above-described procedure, the ECU 209 may determine that the pressure in the first tire 102a is below a target tire pressure, for example by more than a predetermined maximum pressure tolerance. In this case, the ECU 209 may determine that the first tire 102a needs to be inflated in order to increase the pressure in the first tire 102a to the target tire pressure, or to within the maximum pressure tolerance of the target tire pressure.

In a first step, the wheel valves 13a-d are closed and the ECU 209 switches the supply valve 203 to its open position 203' or lets the supply valve 203 move to its normally open position 203' to fluidly connect the pressure source 101 to the first common rail 210. The ECU 209 further switches the first channel valve 204a to its first control position 204a' to fluidly connect the first common rail 210 to the first outlet 202a. The ECU 209 may further switch the other channel valves 204b-d to their second control position 204b-d".

The ECU 209 then controls the pressure source 101 to pressurize the first common rail 210, such as until a fluid or air pressure in the first common rail 210 reaches the previously determined pressure in the first tire 102a, or until a fluid or air pressure in the first common rail 210 is within a maximum pressure tolerance of the previously determined pressure in the first tire 102a. When pressurizing the first common rail 210 via the pressure source 201 the fluid or air pressure in the first common rail 210 may be measured or checked using the second pressure sensor 207. During this process, the second pressure sensor 207 may continuously send a pressure signal or pressure data indicative of the fluid or air pressure in the first common rail 210 to the ECU 209, and the ECU 209 may continuously compare the fluid or air pressure in the first common rail 210 with the previously determined pressure in the first tire 102a.

When the ECU 209 determines that the fluid or air pressure in the first common rail 210 has reached the previously determined pressure in the first tire 102a or is within a maximum pressure tolerance of the previously determined pressure in the first tire 102a, the wheel valve 103a of the first tire 102a is opened to fluidly connect the inlet 201 and the pressure source 101 to the first tire 102a. The ECU 209 then controls the pressure source 101 to pressurize the first tire 102a, such as until a fluid or air pressure in the first tire 102a reaches the target pressure, or until a fluid or air pressure in the first tire 102a is within a maximum pressure tolerance of the target pressure. When pressurizing the first tire 102a via the pressure source 101, the fluid or air pressure in the first tire 102a may be measured or checked using either one or both of the first pressure sensor 206 and the second pressure sensor 207. During this process, one or both of the first pressure sensor 206 and the second pressure sensor 207 may continuously send a pressure signal or pressure data indicative of the fluid or air pressure in the first tire 102a to the ECU 209, and the ECU 209 may continuously compare the fluid or air pressure in the first tire 102a with the target pressure.

When the ECU 209 determines that the fluid or air pressure in the first tire 102a has reached the target pressure or is within a maximum pressure tolerance of the target pressure, the wheel valve 103a of the first tire 102a is closed to fluidly isolate the first tire 102a from the first outlet 202a and from the pressure source 101. Subsequently, the ECU 209 may request that the pressure source 101 be turned off, for example by sending a request to a vehicle control unit which may then turn off the pressure source 101. Also, the ECU 209 may switch the supply valve 203 to the closed position 203" to fluidly isolate the first common rail 210 from the inlet 201 and from the pressure source 101, and the ECU 209 may switch the first channel valve 204a to the second control position 204a" to fluidly isolate the first common rail 210 and the first outlet 202a from one another.

Importantly, during the above-described process of pressurizing or inflating the first tire 102a, the first pressure-limiting valve 205a ensures that a fluid or air pressure at the first outlet 202a and in the first tire 102a does not exceed the previously mentioned threshold pressure at which the first pressure-limiting valve 205a opens to place the first outlet 202a in fluid communication with the vent 212. For example, when inflating or pressurizing the first tire 102a as described above, a fluid or air pressure at the first outlet 202a and in the first tire 102a may reach the previously mentioned threshold pressure due to malfunction of one or more of the ECU 209, the pressure source 101, or the pressure sensors 206, 207.

From the above description of the process of inflating or pressurizing a single tire, a person of ordinary skill readily understands how the tire inflation system 100 may be operated in order to inflate or pressurize two or more of the tires 102a-d, for example the first tire 102a and the second tire 102b, simultaneously. Before inflating or pressurizing the first tire 102a and the second tire 102b simultaneously, it may be preferable to first equalize the pressure in the tires 102a and 102b. To that end, the supply valve 203 may be switched to its closed position 203" to fluidly isolate the first common rail 210 from the inlet 201, and subsequently both wheel valves 103a, 103b may be opened and both channel valves 204a, 204b may be switched to their first control position 204a', 204b', thereby allowing the fluid or air pressure in the tires 102a, 102b to equalize via the first common rail 210.

The process of pressurizing or inflating the two tires 102a, 102b simultaneously may then be carried out in analogy to the above-described process of pressurizing or inflating the first tire 102a. However, a person of ordinary skill readily understands that in order to pressurize or inflate the two tires 102a, 102b simultaneously, both of the tires 102a, 102b will have to be simultaneously fluidly connected to the first common rail 210 by keeping both wheel valves 103a, 103b open and by switching both channel valves 204a, 204b to their first control position 204a', 204b' at the same time.

In another mode of operation, the tire pressure in one or more of the tires 102a-d may be decreased by deflating one or more of the tires 102a-d. For example, a single tire may be inflated, or two or more tires may be deflated, either one by one and consecutively, or simultaneously.

For example, when checking the tire pressure in the first tire 102a in accordance with the above-described procedure, the ECU 209 may determine that the pressure in the first tire 102a above a target tire pressure, for example by more than a predetermined maximum pressure tolerance. In this case, the ECU 209 may determine that the first tire 102a needs to be deflated in order to decrease the pressure in the first tire 102a to the target tire pressure, or to within the maximum pressure tolerance of the target tire pressure.

In order to depressurize or deflate the first tire 102a, the first wheel valve 103a is opened and the first channel valve 204a is switched to the second control position 204a" to place the first tire 102a in fluid communication with the second common rail 211 and the vent 212 and to depressurize or deflate the first tire 102a via the second common rail 211 and via the vent 212.

The invention claimed is:
1. A control device for a central tire inflation system, comprising:
  an inlet for connection with a pressure source,
  at least a first outlet for connection with a first pneumatic tire,
  a supply valve,
  at least a first channel valve,
  at least a first pressure-limiting valve, and
  a vent for venting fluid from the first outlet through the vent, wherein the supply valve and the first channel valve selectively fluidly connect the inlet to the first outlet and are fluidly connected in series between the inlet and the first outlet, wherein the first pressure-limiting valve is fluidly connected to the first outlet for limiting a pressure at the first outlet during inflation, and wherein the first pressure-limiting valve includes a pressure-actuatable actuator fluidly connected to the first outlet and biasing the first pressure-limiting valve towards an open position in which the first pressure-limiting valve fluidly connects the first outlet to the vent via the first pressure-limiting valve.

2. The control device of claim 1, further comprising:
a second outlet for connection with a second pneumatic tire,
a second channel valve, and
a second pressure-limiting valve,
wherein the supply valve and the second channel valve selectively fluidly connect the inlet to the second outlet and are fluidly connected in series between the inlet and the second outlet, and
wherein the second pressure-limiting valve is fluidly connected to the second outlet for limiting a pressure at the second outlet.

3. The control device of claim 2, wherein the supply valve selectively fluidly connects the inlet to the first channel valve, or wherein the supply valve selectively fluidly connects the inlet in parallel to the first channel valve and to the second channel valve.

4. The control device of claim 2, wherein the vent further vents fluid from the second outlet through the vent.

5. The control device of claim 4,
wherein the first pressure-limiting valve includes a biasing member biasing the first pressure-limiting valve towards a closed position in which the first pressure-limiting valve blocks the venting of fluid from the first outlet through the first pressure-limiting valve,
wherein the second pressure-limiting valve includes a biasing member biasing the second pressure-limiting valve towards a closed position in which the second pressure-limiting valve blocks the venting of fluid from the second outlet through the second pressure-limiting valve, and
wherein the second pressure-limiting valve includes a pressure-actuatable actuator fluidly connected to the second outlet and biasing the second pressure-limiting valve towards an open position in which the second pressure-limiting valve fluidly connects the second outlet to the vent via the second pressure-limiting valve.

6. The control device of claim 4,
wherein the first channel valve is configured to be selectively placed in either one of a first control position and a second control position, the first channel valve in the first control position fluidly connecting the supply valve to the first outlet, and the first channel valve in the second control position fluidly isolating the supply valve from the first outlet and fluidly connecting the first outlet to the vent; and/or
wherein the second channel valve is configured to be selectively placed in either one of a first control position and a second control position, the second channel valve in the first control position fluidly connecting the supply valve to the first outlet, and the first channel valve in the second control position fluidly isolating the supply valve from the first outlet and fluidly connecting the first outlet to the vent.

7. The control device of claim 2, wherein one or more of the supply valve, the first channel valve and the second channel valve are/is configured to be actuated via electromagnetic signals.

8. The control device of claim 7, further comprising:
an electronic control unit (ECU), and
at least one pressure sensor in communication with the ECU,
wherein the ECU is configured to control one or more of the supply valve, the first channel valve and the second channel valve based on at least one signal received from the at least one pressure sensor.

9. The control device of claim 8, wherein the at least one pressure sensor comprises one or both of:
a first pressure sensor configured to measure a pneumatic pressure at the inlet, and
a second pressure sensor configured to measure a pneumatic pressure in a fluid conduit fluidly connecting the supply valve to the first channel valve, or fluidly connecting the supply valve to the first channel valve and to the second channel valve.

10. The control device of claim 2, further comprising a manifold block, wherein the inlet, the first outlet, the supply valve, the first channel valve and the first pressure-limiting valve, and the second channel valve and the second pressure-limiting valve, are disposed in or mounted on the manifold block.

11. A tire inflation system, comprising:
the control device of claim 1,
a pressure source such as a compressor or a pump fluidly connected or selectively fluidly connected to the inlet of the control device,
at least a first tire fluidly connected or selectively fluidly connected to the first outlet of the control device.

12. A method of operating the control device according to claim 1, the method comprising the steps:
fluidly connecting the inlet to the first outlet, and to a first tire fluidly connected to the first outlet, via the supply valve and the first channel valve,
pressurizing the first outlet, and the first tire fluidly connected to the first outlet, via the inlet, the supply valve and the first channel valve, and
if or when a pressure at the first outlet, and a pressure in the first tire fluidly connected to the first outlet, exceeds a threshold pressure, venting the first outlet, and the first tire fluidly connected to the first outlet, via the first pressure-limiting valve.

13. The method of operating the control device according to claim 12, the method further comprising the steps:
venting the first outlet, and a first tire fluidly connected to the first outlet, by placing the first outlet, and the first tire fluidly connected to the first outlet, in fluid communication with a vent via the first channel valve.

14. The method of operating the control device according to claim 12, the method further comprising the steps:
closing the supply valve to fluidly isolate the first outlet, and a first tire fluidly connected to the first outlet, from the inlet;
placing the first outlet, and the first tire fluidly connected to the first outlet, in fluid communication with a pressure sensor via the first channel valve, and measuring a pressure at the first outlet, and a pressure in the first tire fluidly connected to the first outlet, using the pressure sensor.

\* \* \* \* \*